Feb. 25, 1964 W. E. BUCK 3,122,052
ROTATING MIRROR CAMERA
Filed Aug. 22, 1960 2 Sheets-Sheet 2

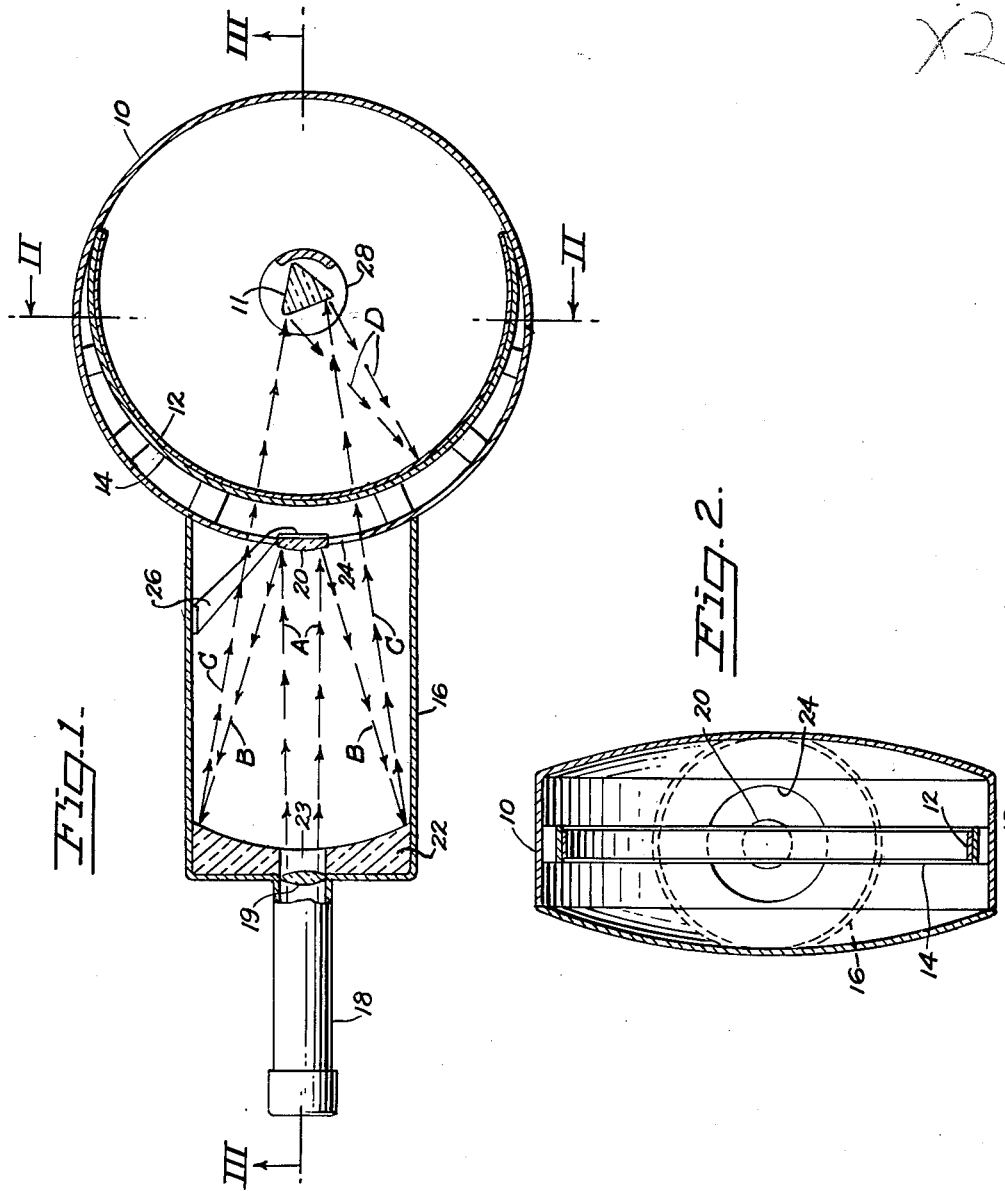

INVENTOR.
WILLARD E. BUCK
BY
Fryer + Tjensvold
ATTORNEYS

3,122,052
ROTATING MIRROR CAMERA

Willard E. Buck, Boulder, Colo., assignor, by mesne assignments, to Beckman & Whitley, Inc., San Carlos, Calif., a corporation of Delaware
Filed Aug. 22, 1960, Ser. No. 51,053
5 Claims. (Cl. 88—16)

This invention relates to rotating mirror cameras and particularly to optical relay systems for such cameras.

There are many known kinds of rotating mirror cameras of both the streak and framing type. In such cameras, a strip of film is arranged in a substantially arcuate path within a drum-shaped housing with a rotatable mirror disposed centrally. Light from an event to be recorded is focused through objective and relay optical systems onto the face or faces of said mirror which upon being rotated sweeps the focused beam lengthwise of the sensitized film to expose the event thereon.

In some cameras, a light aperture to admit the focused beam is formed in the cylindrical wall of the drum-shaped housing. This has the disadvantage that the film and support therefor must be interrupted at the aperture and to obtain so called continuous writing or exposure of the event being recorded without interruption, a many faced rotating mirror must be employed. In fact it is common practice to employ octagonal or eight faced mirrors for this purpose. Since the mirror rotates at very high speeds, its size is critical and the individual faces are small and limit the amount of light transmitted for exposure of the film. Moreover, there is a duplication of recording as one face of the mirror reflects the beam to the film on one side of the aperture at the same time that another face is reflecting the beam with the same data to be recorded to the film on the opposite side of the aperture. Thus a continuous picture or a series of pictures can be obtained only by careful matching of the two film strips which bear what is in effect an overlapping record of the event.

There are other cameras with drum-shaped housings in which the focused beam is introduced over the edge of the drum to impinge a central rotating mirror and to be reflected thereby onto the uninterrupted face of the film strip which conforms generally to the contour of the inner drum face. This permits the use of a triangular or three face mirror which has larger mirror surfaces than an octagonal one of the same overall size. It also obviates the necessity of interrupting the film strip because there is no need for a light aperture in the drum-shaped wall of the housing. A serious disadvantage of the type of camera last described is that the mirror and, therefore, its reflecting faces must be offset laterally with respect to the film strip. Thus the beam of light from the image to be recorded impinges the film at an angle to a line which is normal to the plane of the film. Since the focused beam is in effect longer at one side than at the other because of this angularity, good resolution and high photographic definition are sacrificed.

It is the object of the present invention to overcome the above recited and other disadvantages of known cameras of the rotating mirror type and to provide a rotating mirror camera in which a focused beam from an objective optical system is relayed toward a continuous strip of film with the axis of the beam normal to the plane of the film.

Further and more specific objects and advantages of the invention and the manner in which it is carried into practice are made apparent in the following specification by reference to the accompanying drawings.

In the drawings:

FIG. 1 is a schematic view representing a central vertical section through a rotating mirror camera embodying the present invention and illustrating particularly the relay optical system thereof;

FIG. 2 is a schematic sectional view taken on the line II—II of FIG. 1;

Figure 3:
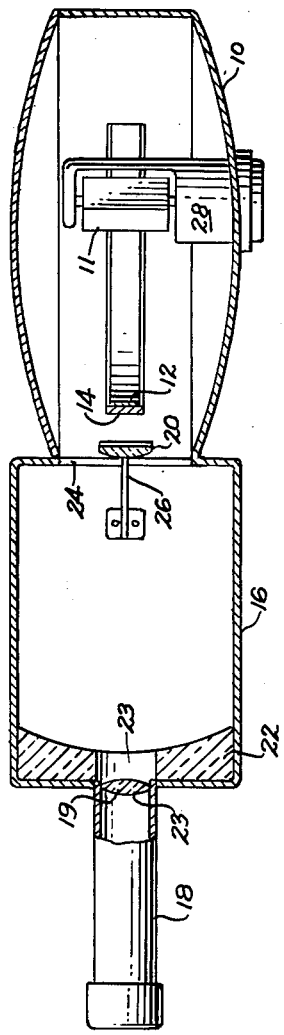
FIG. 3 is a schematic sectional view taken on the line III—III of FIG. 1.

The drawings show a camera having a generally drum-shaped housing 10 which is, of course, light tight and contains a rotatable triangular mirror 11, the axis of rotation of which is slightly eccentric with respect to the housing and which serves to reflect a focused beam of light against a sensitized film 12 carried on a film support 14. The configuration of the support 14 varies slightly from a true arc as it is in accordance with conventional practice contoured to follow the path of the focal point of the beam from a reflecting surface of the mirror 11 as it rotates to insure perfect focus of an object or event being recorded on the surface of the film. An optical relay system housing 16 engages or communicates with the housing 10 and supports an objective optical system contained within a tubular casing 18 at its forward end. The casing 18 contains conventional object and field lenses, the latter being shown at 19, for directing a beam of light including the image of the event to be recorded into the housing 16 of the relay optical system. The relay optical system comprises a convex mirror 20 and a large concave mirror 22 with a circular aperture 23 disposed centrally thereof and in alignment with the optical axis of the objective system. The beam of light entering through the objective system is directed against and reflected by the convex mirror 20 which directs it to the annular reflecting surface of the concave mirror 22 which in turn reflects it rearwardly through a large aperture 24 in the cylindrical surface of the drum-shaped housing 10. The path of this beam is represented in FIG. 1 by arrows A, B and C. The converging beam represented by arrows C from the concave mirror impinges and is reflected by a face of the rotating mirror 11 where it continues in a converging path as indicated by arrows D which is kept in precise focus throughout the length of the film on the support 14. The aperture 24 in the housing 10 is considerably larger than the convex mirror 20 and very much wider as may be seen in FIG. 2 than the film support 24 which passes directly behind it. Therefore the large beam focused through this aperture is only partially interrupted by the mirror 20 and the film support and ample light is admitted for adequate exposure of the sensitized film. The mirror 20 is preferably supported on a narrow bracket 26 aligned with the film support 14 so that it does not cause additional loss of light.

With the above described arrangement of the optical relay system, the undesirable interruption of the film strip behind the aperture in the wall of the drum-shaped housing is not necessary and the angular approach of the beam to the film which occurs when it is introduced from the side or over the cylindrical wall of the drum-shaped housing is eliminated. Thus a well focused beam with ample light for exposure is easily swept throughout the length of a film strip through an arc of about 240°.

Cameras of the type generally disclosed herein may be used as streak cameras with the addition of a narrow or slit-type aperture in the optical system or they may be used as framing cameras with the addition of suitable so called shuttering masks and relay optics. These additional elements, however, form no part of the present invention and their use and arrangement are well known to those skilled in the art so that their disclosure herein would serve no useful purpose. Rotating mirrors such as that shown at 11 are conventionally driven as by electric motors or gas turbines, also of well known and conventional design and one of which is shown at 28 in the drawings.

The triangular or three faced mirror herein illustrated is preferred because it accomplishes continuous writing or exposure of the film throughout its full length. However in cases where continuous writing is not necessary a one or two faced rotating mirror may be used.

Figure 4:
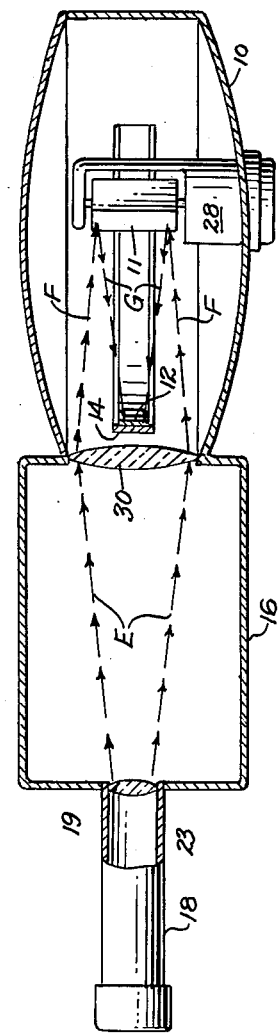
FIG. 4 is a schematic view like FIG. 3 showing a modified form of the invention.

A modification of the invention herein described is shown in FIG. 4. In this figure, the principal parts of the camera are designated by the reference characters used on the other figures where the parts are the same. A lens 30 takes the place of the mirrors 20 and 22 in FIG. 1 and the path of the light beam from the objective optical system is indicated by sets of arrows designated E, F and G. Since lens 30 is much greater in diameter than the width of the film support 14, it is readily apparent that the same general effect is obtained as that described in connection with FIG. 1.

I claim:

1. In a rotating mirror camera in which a beam introduced through an objective optical system is relayed to a rotating mirror in a film housing for reflection to a film supported therein, an objective and a relay optical system arranged on a common axis, and means to support the film in a position which intersects said axis in an area where the beam is converging and of greater size than the width of the film support whereby the greater part of the light in the beam will be reflected by the rotating mirror to be swept throughout the length of a film on said support.

2. In a rotating mirror camera in which a beam introduced through an objective optical system is relayed to a rotating mirror in a film housing for reflection to a film supported therein, a convex mirror in axial alignment with the beam to reflect it reversely in a diverging path, and a concave mirror concentrically positioned and having a central aperture to admit the beam from the objective system for relaying the beam in a converging path beyond the convex mirror to the rotating mirror.

3. In a rotating mirror camera in which a beam introduced through an objective optical system is relayed to a rotating mirror in a film housing for reflection to a film supported therein, a convex mirror in axial alignment with the beam to reflect it reversely in a diverging path, and a concave mirror concentrically positioned and having a central aperture to admit the beam from the objective system for relaying the beam in a converging path beyond the convex mirror to the rotating mirror, said film housing having an aperture therein concentric with and larger than the convex mirror to admit the beam from the concave mirror.

4. In a rotating mirror camera in which a beam introduced through an objective optical system is relayed to a rotating mirror in a film housing for reflection to a film supported therein, a convex mirror in axial alignment with the beam to reflect it reversely in a diverging path, a concave mirror concentrically positioned and having a central aperture to admit the beam from the objective system for relaying the beam in a converging path beyond the convex mirror to the rotating mirror, said film housing having an aperture therein concentric with and larger than the convex mirror to admit the beam from the concave mirror, and a generally arcuate support for said film disposed in a path within said housing which intersects the beam from the convex mirror.

5. In a rotating mirror camera in which a beam introduced through an objective optical system is relayed to a rotating mirror in a film housing for reflection to a film supported therein, a convex mirror in axial alignment with the beam to reflect it reversely in a diverging path, and a concave mirror concentrically positioned and having a central aperture to admit the beam from the objective system for relaying the beam in a converging path beyond the convex mirror to the rotating mirror, said film housing having an aperture therein concentric with and larger than the convex mirror to admit the beam from the concave mirror, the relative sizes of the convex mirror, the film support, and said aperture in the film being such that the greater portion of light in the beam from the concave mirror is transmitted to the rotating mirror.

References Cited in the file of this patent

UNITED STATES PATENTS

| | | |
|---|---|---|
| 2,593,189 | Rinia et al. | Apr. 15, 1952 |
| 2,684,015 | Grey | July 20, 1954 |
| 2,685,820 | Kaprelian | Aug. 10, 1954 |
| 2,730,004 | Badger et al. | Jan. 10, 1956 |
| 2,822,721 | Parker et al. | Feb. 11, 1958 |
| 2,853,918 | Yoler | Sept. 30, 1958 |